(12) United States Patent
Sumbul et al.

(10) Patent No.: US 11,157,799 B2
(45) Date of Patent: *Oct. 26, 2021

(54) NEUROMORPHIC CIRCUITS FOR STORING AND GENERATING CONNECTIVITY INFORMATION

(71) Applicant: Intel Corporation, Santa Clara, CA (US)

(72) Inventors: Huseyin E. Sumbul, Hillsboro, OR (US); Gregory K. Chen, Hillsboro, OR (US); Raghavan Kumar, Hillsboro, OR (US); Phil Christopher Knag, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,014

(22) Filed: Mar. 11, 2019

(65) Prior Publication Data

US 2019/0205730 A1    Jul. 4, 2019

Related U.S. Application Data

(63) Continuation of application No. 15/392,407, filed on Dec. 28, 2016, now Pat. No. 10,248,906.

(51) Int. Cl.
*G06E 1/00* (2006.01)
*G06N 3/04* (2006.01)
(Continued)

(52) U.S. Cl.
CPC .......... *G06N 3/049* (2013.01); *G06N 3/063* (2013.01); *G06N 3/088* (2013.01)

(58) Field of Classification Search
CPC ......... G06N 3/049; G06N 3/063; G06N 3/088
(Continued)

(56) References Cited

U.S. PATENT DOCUMENTS 5,220,559 A    6/1993    Tsuzuki et al.
5,333,239 A    7/1994    Watanabe et al.
(Continued)

FOREIGN PATENT DOCUMENTS

EP    3089080    11/2016
WO    2016030230    3/2016

OTHER PUBLICATIONS

International Preliminary Report on Patentability dated Jul. 11, 2019 for PCT Patent Application No. PCT/US2017/062422.
(Continued)

*Primary Examiner* — Viet Q Nguyen
(74) *Attorney, Agent, or Firm* — Schwabe, Williamson & Wyatt, P.C.

(57) ABSTRACT

A neuromorphic computing system is provided which comprises: a synapse core; and a pre-synaptic neuron, a first post-synaptic neuron, and a second post-synaptic neuron coupled to the synaptic core, wherein the synapse core is to: receive a request from the pre-synaptic neuron, generate, in response to the request, a first address of the first post-synaptic neuron and a second address of the second post-synaptic neuron, wherein the first address and the second address are not stored in the synapse core prior to receiving the request.

20 Claims, 8 Drawing Sheets

(51) Int. Cl.
*G06N 3/063* (2006.01)
*G06N 3/08* (2006.01)

(58) Field of Classification Search
USPC .......................................................... 706/25
See application file for complete search history.

(56) References Cited

U.S. PATENT DOCUMENTS

| | | | |
|---|---|---|---|
| 8,909,576 B2 | 12/2014 | Akopyan | |
| 8,990,130 B2 | 3/2015 | Alvarez-Icaza | |
| 9,239,984 B2 | 1/2016 | Arthur | |
| 9,390,369 B1 | 7/2016 | Sinyayskiy | |
| 9,406,015 B2 | 8/2016 | Appuswamy | |
| 9,582,370 B2 | 2/2017 | Yano | |
| 9,852,006 B2 | 12/2017 | Akopyan | |
| 9,881,251 B2 | 1/2018 | Modha | |
| 10,360,496 B2 * | 7/2019 | Chen | G06N 3/049 |
| 10,482,372 B2 * | 11/2019 | Chen | G06N 3/04 |
| 10,713,558 B2 * | 7/2020 | Sumbul | G06N 3/04 |
| 2007/0208678 A1 | 9/2007 | Matsugu | |
| 2013/0031040 A1 | 1/2013 | Modha | |
| 2013/0073497 A1 | 3/2013 | Akopyan | |
| 2013/0073499 A1 * | 3/2013 | Izhikevich | G06N 3/08 |
| | | | 706/27 |
| 2013/0144821 A1 * | 6/2013 | Heliot | G06N 3/02 |
| | | | 706/15 |
| 2013/0339281 A1 | 12/2013 | Datta | |
| 2014/0032458 A1 | 1/2014 | Sinyavskiy et al. | |
| 2014/0032464 A1 | 1/2014 | Esser | |
| 2014/0156578 A1 * | 6/2014 | Thibeault | G06N 3/049 |
| | | | 706/26 |
| 2014/0188771 A1 | 7/2014 | Modha | |
| 2014/0189646 A1 | 7/2014 | Suryadevara et al. | |
| 2014/0351190 A1 * | 11/2014 | Levin | G06N 3/049 |
| | | | 706/25 |
| 2015/0058268 A1 | 2/2015 | Modha | |
| 2015/0106316 A1 | 4/2015 | Birdwell | |
| 2015/0220831 A1 | 8/2015 | Hunzinger | |
| 2015/0254551 A1 | 9/2015 | Alvarez-Icaza et al. | |
| 2015/0262055 A1 | 9/2015 | Akopyan et al. | |
| 2015/0286924 A1 | 10/2015 | Arthur et al. | |
| 2016/0004962 A1 | 1/2016 | Appuswamy et al. | |
| 2016/0155047 A1 | 6/2016 | Esser et al. | |
| 2016/0196488 A1 | 7/2016 | Ahn | |
| 2016/0321539 A1 | 11/2016 | Alvarez-Icaza et al. | |
| 2016/0358075 A1 | 12/2016 | Zhang et al. | |
| 2017/0200078 A1 | 7/2017 | Bichler | |
| 2017/0286829 A1 | 10/2017 | Chen et al. | |
| 2017/0300809 A1 | 10/2017 | Modha | |
| 2018/0018566 A1 | 1/2018 | Ehrman et al. | |
| 2018/0143762 A1 | 5/2018 | Kim et al. | |
| 2018/0189631 A1 | 7/2018 | Sumbul et al. | |
| 2018/0189632 A1 | 7/2018 | Kumar et al. | |
| 2018/0285736 A1 | 10/2018 | Baum et al. | |
| 2018/0300606 A1 | 10/2018 | Corkery et al. | |

OTHER PUBLICATIONS

International Search Report and Written Opinion for International Patent Application No. PCT/US17/62422, dated Mar. 29, 2018.
Notice of Allowance dated Dec. 5, 2018 for U.S. Appl. No. 15/392,407.
Restriction Requirement for U.S. Appl. No. 15/392,407, dated Nov. 9, 2017.
U.S. Non-Final Office Action dated Aug. 15, 2018 for U.S. Appl. No. 15/392,407.
Cruz-Albrecht, J. et al., "Paper A scalable neural chip with synaptic electronics using CMOS integrated memristors", Sep. 2, 2013 • 2013 IOP Publishing Ltd, Nanotechnology, vol. 24, No. 38.
Merolla, P. et al., "A million spiking-neuron integrated circuit with a scalable communication network and interface", Science Aug. 8, 2014: vol. 345, Issue 6197, pp. 668-673, DOI: 10.1126/science. 1254642.
Seo, J. et al., "A 45nm CMOS Neuromorphic Chip with a Scalable Architecture for Learning in Networks of Spiking Neurons", IBM Wastson Research Center, IEEE Conference, Sep. 2011.
Shukla, A. et al., "An On-Chip Trainable and Clock-less Spiking Neural Network with 1 R Memristive Synapses", IEEE, Sep. 2017.
Extended European Search Report dated Jul. 22, 2020 for European Patent Application No. 17886419.5.
Chen, Gregory et al., "4096-Neuron IM-Synapse 3.8-pJ/SOP Spiking Neural Network With On-Chip STOP Learning and Sparse Weights in 10-nm FinFET CMOS", IEEE Journal of Solid-State Circuits, vol. 54, No. 4, Apr. 1, 2019, ages 992-1002, XP011716783, ISSN: 0018-9200, DOI: 10.1109/JSSC.2018.2884901, [retrieved on Mar. 26, 2019].
Zapata, Mireya et al., Compact Associative Memory for AER Spike Decoding in FPGA-Based Evolvable SNN Emulation; Aug. 13, 2016 Int'l Conf on Pervasive Computing; Springer, Berlin, Heidelberg, pp. 339-407, XP047353211, ISBN: 978-3-642-17318-9 [retrieved Aug. 31, 2016].

* cited by examiner

NEUROMORPHIC CIRCUITS FOR STORING AND GENERATING CONNECTIVITY INFORMATION

CLAIM OF PRIORITY

This Application is a Continuation of, and claims priority to, U.S. patent application Ser. No. 15/392,407, filed 28 Dec. 2016, and titled "NEUROMORPHIC CIRCUITS FOR STORING AND GENERATING CONNECTIVITY INFORMATION," which is incorporated by reference in its entirety for all purposes.

BACKGROUND

In a neuromorphic computing system, there may be hundreds, thousands, or even millions of neurons, where a neuron may be connected to a corresponding plurality of neurons. For example, a first neuron may be connected to a few other neurons, hundreds of other neurons, or even thousands other neurons. The connections between the neurons in a neuromorphic computing system can be sparse and random (e.g., not follow any specific pattern). Storing connectivity information of all the neurons in a neuromorphic computing system may require large amount of storage space.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
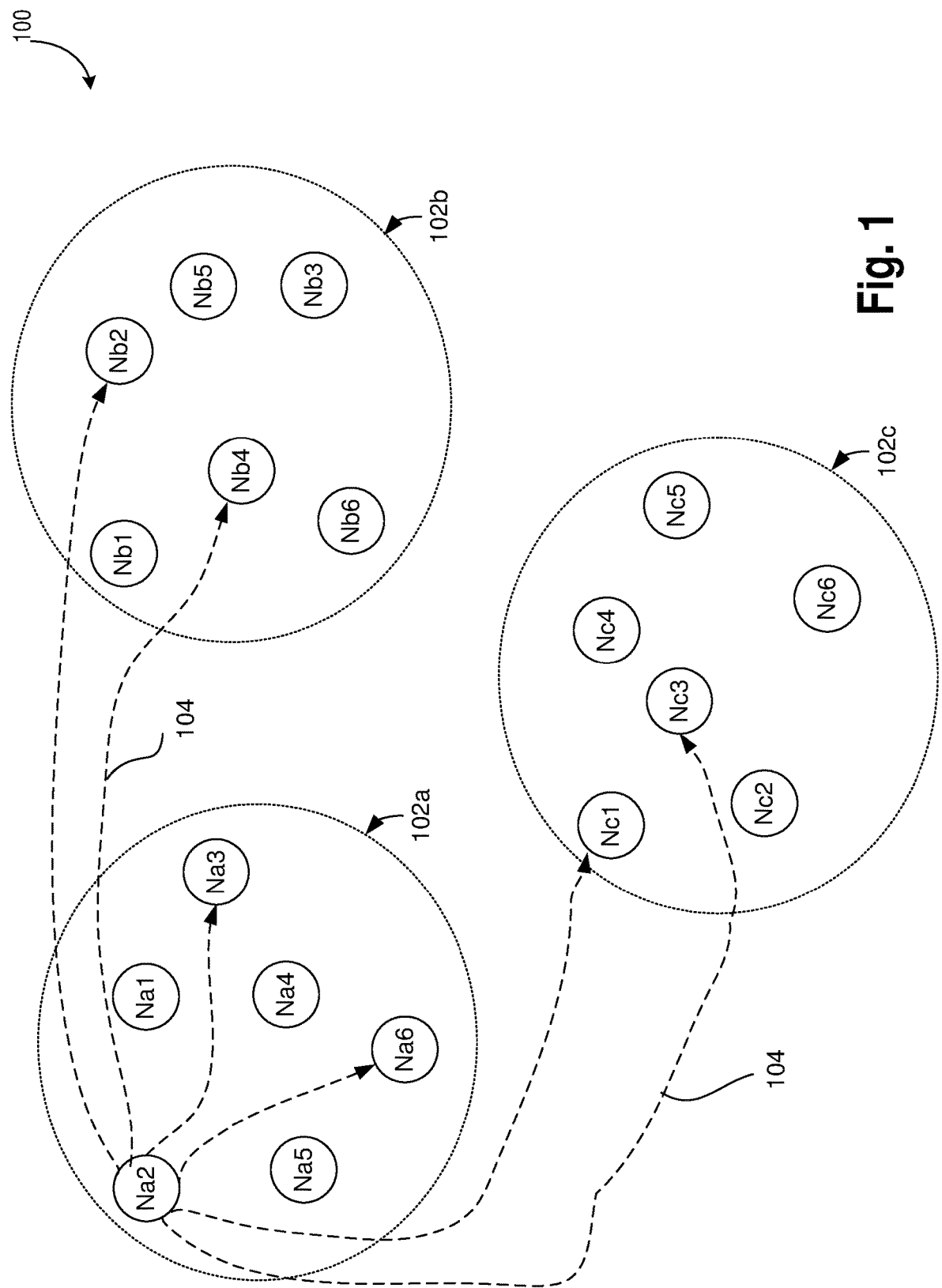
FIG. 1 schematically illustrates a neuromorphic computing system comprising a network of interconnected neurons, according to some embodiments.

In some embodiments, connections between neurons in a neuromorphic computing system may be sparse and random. Owing to a large number of neurons (e.g., thousands, or even millions) in a neuromorphic computing system, storing information about connectivity between these neurons can require a large amount of memory space. The teachings of this disclosure mitigate this issue by, for example, not storing at least part of connectivity information in the neuromorphic computing system. Rather, such connectivity information is generated on-the-fly, as and when required, thereby saving memory space.

For example, a pre-synaptic neuron may send spikes to a plurality of post-synaptic neurons via a synapse core. Conventionally, for a specific pre-synaptic neuron, the synapse core may store addresses of all the post-synaptic neurons, which may consume a large storage space in a conventional system. In contrast, in some embodiments, the synapse core disclosed herein may store seed numbers, which, for example, consume less storage space than storing the addresses of all the post-synaptic neurons. When the synapse core is to transmit spikes from a pre-synaptic neuron to a plurality of post-synaptic neurons, the synapse core generates (e.g., on-the-fly) the addresses of the plurality of post-synaptic neurons from the seed numbers. For example, the synapse core uses a finite filed mathematical function (e.g., a Galois field function) to map the addresses of the plurality of post-synaptic neurons from the seed numbers.

Furthermore, when spikes from the pre-synaptic neuron are to be transmitted to the plurality of post-synaptic neurons, a spike to a corresponding post-synaptic neuron may be weighted by a corresponding synaptic weight. In some embodiments, a synaptic weight may be a multi-bit number to represent higher (or lower) synaptic weight resolution and/or a signed number (e.g. positive or negative) to represent excitatory and inhibitory behavior (e.g., as seen in some mammal brains). This requires storage of a plurality of synaptic weights corresponding to the pre-synaptic neuron and the plurality of post-synaptic neurons. In some embodiments, a memory is used to store the synaptic weights in a compact manner, e.g., which requires less storage space. Furthermore, in some embodiments, the memory storing the synaptic weights interact in a unique manner with the mapping function so that each post-synaptic neuron address generated by the mapping function can be matched with a corresponding synaptic weight, and the combination of the post-synaptic neuron address and the synaptic weight can be transmitted with the spike to the corresponding post-synaptic neuron.

There are many technical effects of the various embodiments. For example, generating in real time the post-synaptic neuron addresses from the seed numbers as and when required, instead of actually storing all the post-synaptic neuron addresses in the synapse core, may significantly reduce a storage space requirement of the synapse core. Similarly, storing the synaptic weights in a storage efficient manner may also reduce the storage space requirement of the synapse core. This may result in a smaller and faster synapse core, which eventually may result in a faster and smaller neuromorphic computing system. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a neuromorphic computing system 100 (henceforth referred to as a "system 100") comprising a network of interconnected neurons (e.g., neurons Na1, Na2, etc.), according to some embodiments. In an example, the term "neuromorphic" refers to electronic circuitry designed to mimic neuro-biological architectures present in nervous systems to, for example, overcome parallel computation bottlenecks in machine learning systems. These systems, e.g., the system 100 of FIG. 1, may be designed to process sensory data such as images and sounds and to respond to changes in data in ways not specifically programmed into the system. A "neuron" in a neuromorphic computing system is a computation sub-block. For the purposes of this disclosure, a neuron is also referred to as a computational node, a computational block, a computational sub-block, a computing node, a node, a neuron node, or the like.

Neuron groups or neuron cores represent a core computation block in a neuromorphic computing system, e.g., the system 100. In some embodiments, the system 100 comprises three neuron groups or neuron cores 102a, 102b, and 102c (generally referred to as a core 102 in singular, and cores 102 in plural), illustrated using dotted lines in FIG. 1. A core 102, for example, comprises a group of neurons.

Although FIG. 1 illustrates the system 100 comprising only three cores, such a number of cores is merely an example, and the system 100 is likely to include a larger number of cores, e.g., tens, hundreds, thousands, or even millions of such cores.

In some embodiments, each core 102 comprises a corresponding plurality of neurons. For example, the core 102a comprises neurons Na1, . . . , Na6 (generally referred to as a neuron Na in singular, and neurons Na in plural), the core 102b comprises neurons Nb1, . . . , Nb6 (generally referred to as a neuron Nb in singular, and neurons Nb in plural), and the core 102c comprises neurons Nc1, . . . , Nc6 (generally referred to as a neuron Nc in singular, and neurons Nc in plural).

Although each core in FIG. 1 is illustrated to include six neurons, such a number is merely an example, and each core may include any different number of neurons. In an example, each core may include 64 neurons (or another appropriate number of neurons). In an example, the cores can include different number of neurons (e.g., the core 102a may include Pa number of neurons, and the core 102b may include Pb number of neurons, where Pa is different from Pb). The neurons Na1, . . . , Na6, Nb1, . . . , Nb6, Nc1, . . . , Nc6 are generally referred to as a neuron N in singular, and neurons N in plural.

In some embodiments, the system 100 is incorporated in a semiconductor chip or die. The system 100 may receive one or more inputs from sources external to the system 100. These inputs may be transmitted to one or more neurons within the system 100. Neurons Na, Nb, Nc and components thereof may be implemented using circuitry or logic.

In some embodiments, a neuron can communicate with one or more other neurons. For example, the neuron Na2 in FIG. 1 is illustrated to transmit signals or spikes to neurons Na3 and Na6 of the core 102a, neurons Nb2 and Nb4 of the core 102b, and neurons Nc1 and Nc3 of the core 102c. Although the neuron Na2 is illustrated to transmit to two neurons in each core, such a number is merely an example, and a neuron can communicate with any different number of neurons in each core.

The connection from a neuron to another neuron is referred to as a synapse, labelled as synapse 104 in FIG. 1. The synapses 104 are illustrated using dotted lines in FIG. 1 because, for example, as discussed herein, the synapses 104 include various components not illustrated in FIG. 1, and the synapses 104 in this figure merely illustrates flow of signals or spikes from one neuron to another. Although synapses 104 originating only from the neuron Na2 are illustrated in FIG. 1 for sake of simplicity, such synapses 104 may also exist from other individual neurons to other corresponding plurality of neurons.

In some embodiments, the neurons N and the synapses 104 may be interconnected such that the system 100 operates to process or analyze information received by the system 100. In general, a neuron N may transmit an output pulse (or "fire" or "spike") when an accumulation of inputs received in the neuron exceed a threshold. In some embodiments, a neuron (e.g., the neuron Na2) may sum or integrate signals received at an input of the neuron Na2. When this sum (referred to as a "membrane potential") exceeds the threshold, the neuron Na2 may generate an output pulse or spike, e.g., using a transfer function such as a sigmoid or threshold function.

In some embodiments, the neurons N may be implemented as a "leaky integrate and fire" neuron. A leaky integrate and fire neuron may sum signals received at neuron inputs into a membrane potential and may also apply a decay factor (or leak) to reduce the membrane potential. Therefore, a leaky integrate and fire neuron may fire if multiple input signals are received at the input rapidly enough to exceed the threshold, e.g., before the membrane potential of the neuron decays too low to fire. In some embodiments, neurons N may be implemented using circuits or logic that receive inputs, integrate inputs into a membrane potential, and decay a membrane potential. In some embodiments, inputs may be averaged, or any other suitable transfer function may be used. Furthermore, in an example, neurons N may include comparator circuits or logic that generate an output spike at an output when the result of applying a transfer function to the input exceeds the threshold. Once a neuron fires, the neuron may disregard previously received input information by, for example, resetting the membrane potential to 0 or another suitable default value. Once the membrane potential is reset to 0, the neuron may resume normal operation after a suitable period of time (sometimes referred to as a refractory period).

In some embodiments, a synapse 104 from a first neuron to a second neuron (e.g., from the neuron Na2 to the neuron Nc3) may operate to transmit signals (e.g., spikes) from an output of the first neuron Na2 to an input of the second neuron Nc3. An instance of a neuron N (e.g., the neuron Na2) generating an output to be transmitted over an instance of a synapse 104 may be referred to as a "pre-synaptic neuron" with respect to that instance of synapse 104. An instance of a neuron N (e.g., the neuron Nc3) receiving an input transmitted over an instance of the synapse 104 may be referred to as a "post-synaptic neuron" with respect to that instance of the synapse 104. Thus, for example, for the synapse 104 for the connection from the neuron Na2 to the neuron Nc3, the neuron Na2 may be the pre-synaptic neuron and the neuron Nc3 may be the post-synaptic neuron.

Because a neuron N (e.g., the neuron Na2) may receive inputs from one or more instances of the synapse 104, and may also transmit outputs over one or more instances of the synapse 104, the neuron Na2 may therefore be both a "pre-synaptic neuron" and "post-synaptic neuron," with respect to various instances of the synapses 104.

In some embodiments, the system 100 may include a reconfigurable interconnect architecture or dedicated hard-wired interconnects to connect synapses 104 to neurons N. The system 100 may include circuitry or logic that allows synapses 104 to be allocated to different neurons as needed based on the neural network topology and neuron fan-in/fan-out. For example, the synapses 104 may be connected to the neurons N using an interconnect fabric, such as network-on-chip, or with dedicated connections. Synapse interconnections and components thereof may be implemented using circuitry or logic.

Figure 2A:
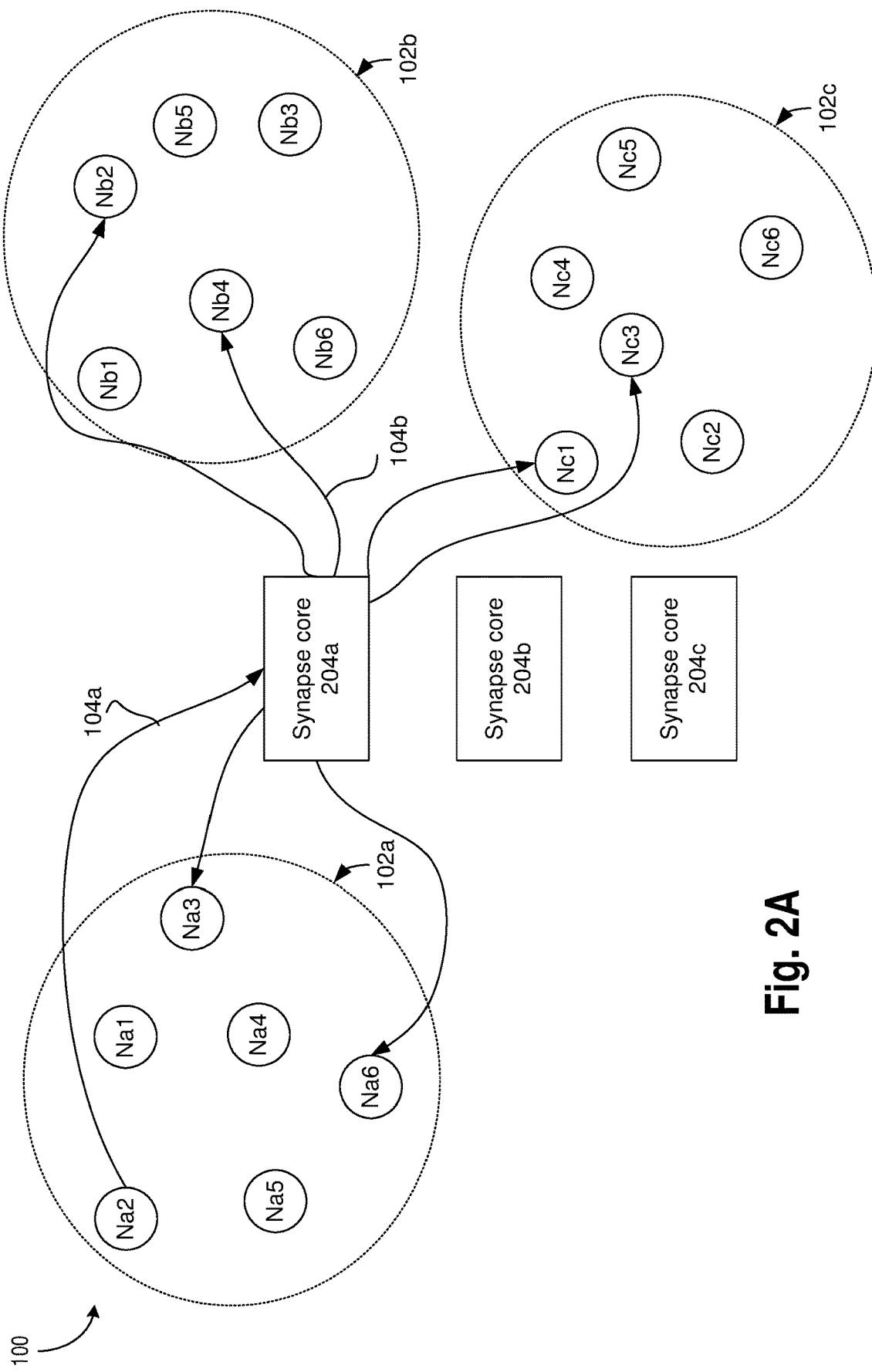
FIGS. 2A, 2B, and 2C schematically illustrate the neuromorphic computing system of FIG. 1 in more details, according to some embodiments.

FIG. 2A schematically illustrates the system 100 of FIG. 1 in more details, according to some embodiments. For example, in FIG. 2A, the synapses 104 of FIG. 1 is illustrated in more details. In some embodiments, a synapse 104 comprises a corresponding synapse core 204, shown as example synapse cores 204a, 204b, and 204c in FIG. 2A, although the system 100 can include any other appropriate number of synapse cores. In some embodiments, the neuron N2a transmits a spike (or a request for spike) to the synapse core 204a, and the synapse core 204a re-transmits the spike (e.g., after appropriately weighting the spike, as will be discussed in detail herein) to the neurons Na3, Na6, Nb2, Nb4, Nc1, and Nc3 of the cores 102a, 102b, and 102c. In some embodiments, a link 104a (e.g., from the neuron Na2 to the synapse core 204a), the synapse core 204a, and a link 104b (e.g., from the synapse core 204a to a neuron Nb4), for example, form a synapse 104 of FIG. 1.

Figure 2B:
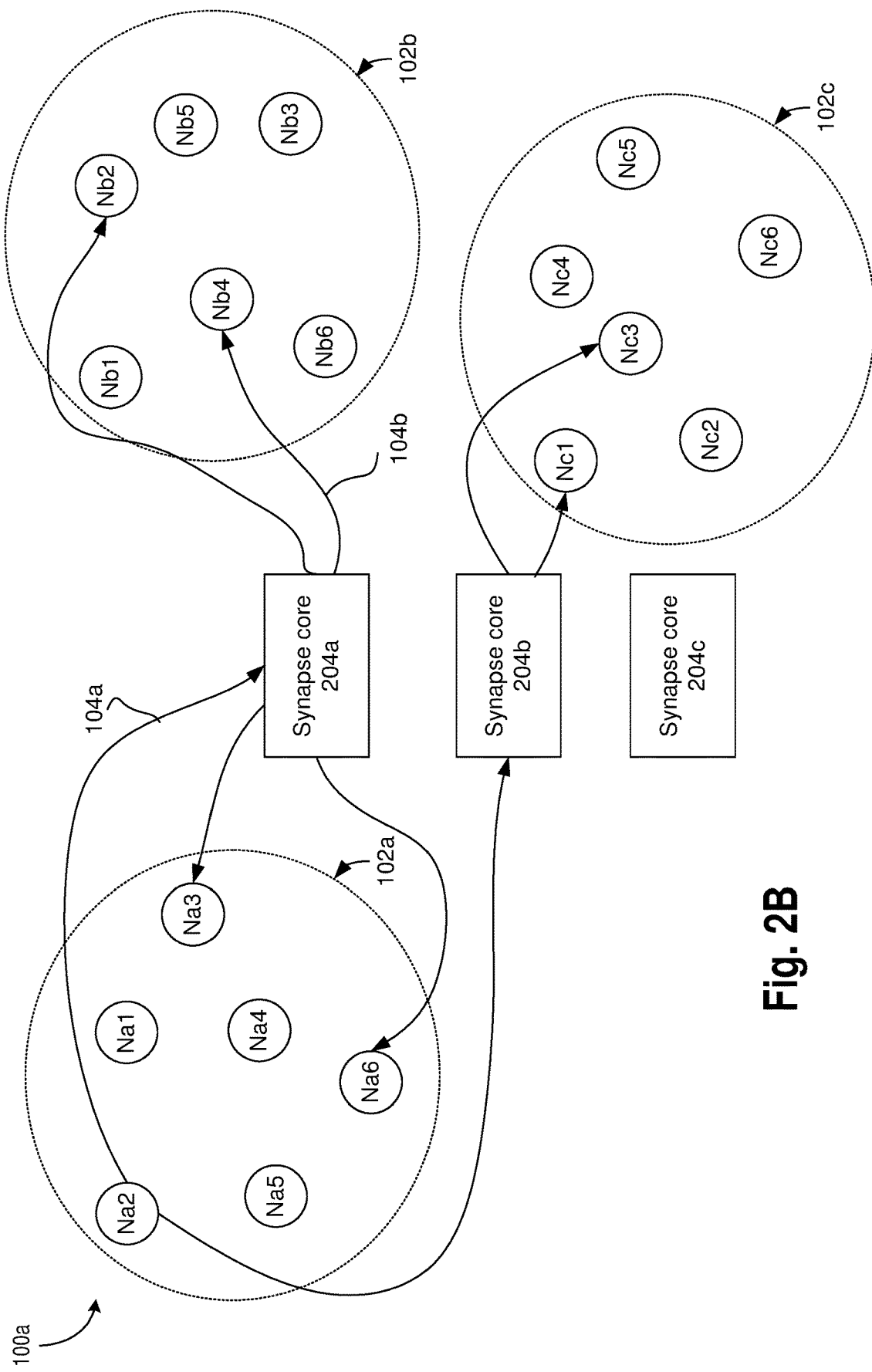

Various variations of FIG. 2A may be possible. For example, FIG. 2A illustrates the neuron Na2 being connected to the various neurons of the cores 102a, 102b, and 102c via the synapse core 204a. However, in some other embodiments and as illustrated in a system 100a in FIG. 2B, the neuron Na2 can be connected to the neurons Na3 and Na6 of the core 102a via the synapse core 204a, the neuron Na2 can be connected to the neurons Nb2 and Nb4 of the core 102b also via the synapse core 204a, and the neuron Na2 can be connected to the neurons Nc1 and Nc3 of the core 102c via a second synapse core 204b.

Figure 2C:
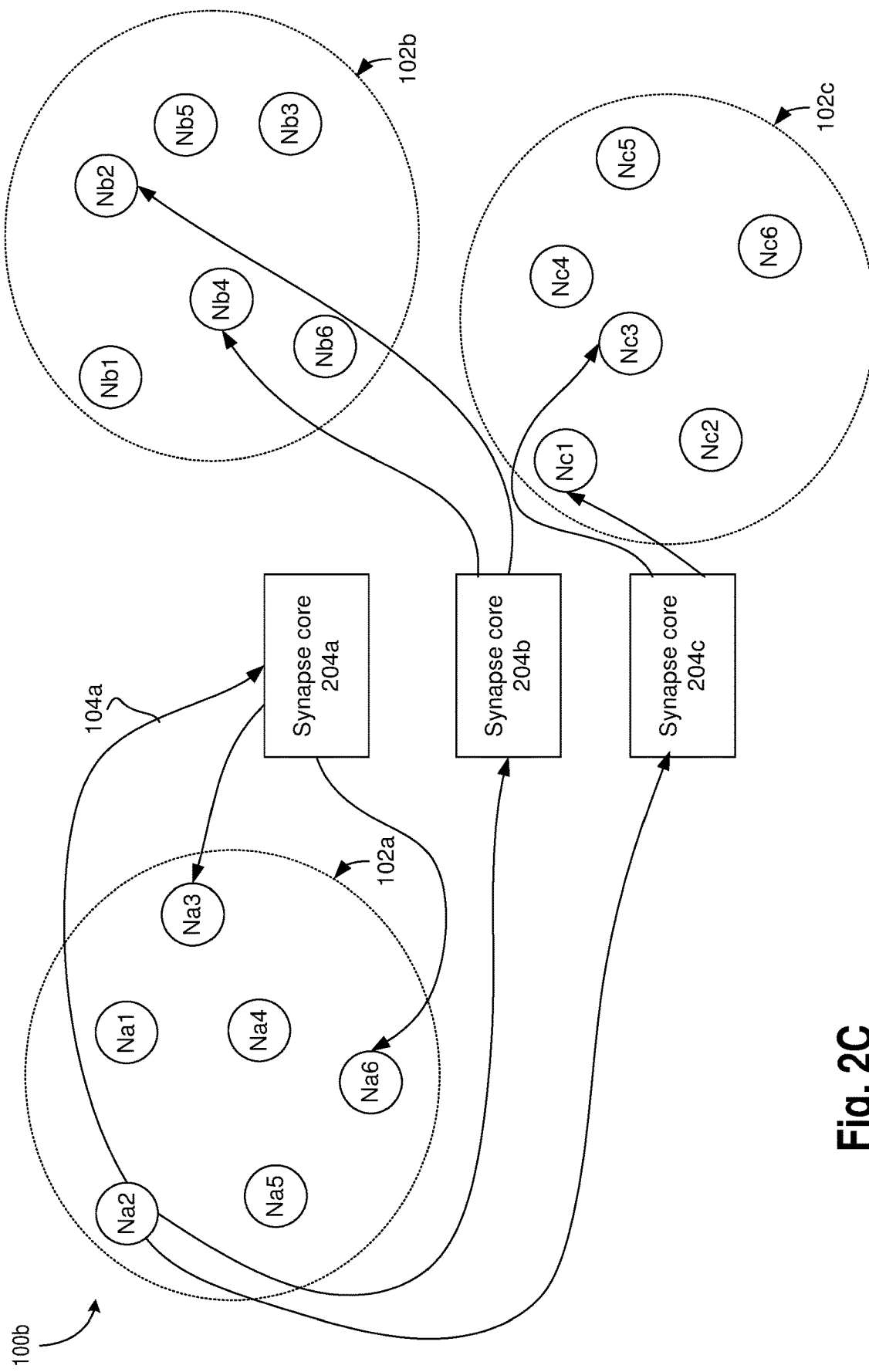

In another example and as illustrated in FIG. 2C, the neuron Na2 of a system 100b can be connected to the neurons Na3 and Na6 of the core 102a via the synapse core 204a, the neuron Na2 can be connected to the neurons Nb2 and Nb4 of the core 102b via the synapse core 204b, and the neuron Na2 can be connected to the neurons Nc1 and Nc3 of the core 102c via the synapse core 204c.

Referring again to FIG. 2A, because the neuron Na2 outputs to the synapse core 204a, this synapse core forms a fan-out synapse core for the neuron Na2. Similarly, in the example of FIG. 2B, the synapse cores 204a and 204b form the fan-out synapse cores for the neuron Na2. Similarly, in the example of FIG. 2C, the synapse cores 204a, 204b and 204c form the fan-out synapse cores for the neuron Na2.

Figure 3:
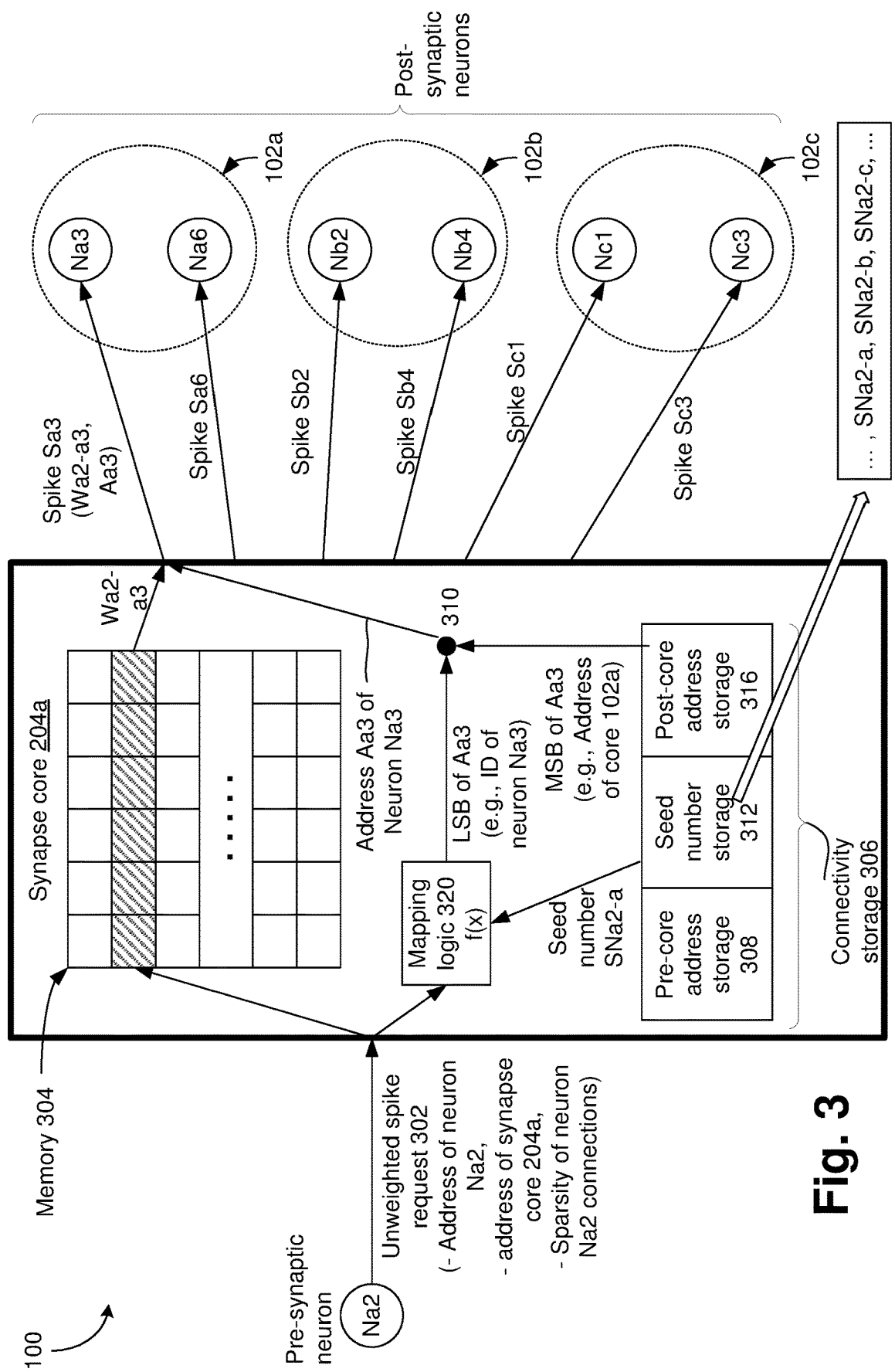
FIG. 3 schematically illustrates a synapse core of a neuromorphic computing system, where the synapse core transmits forward spikes from a pre-synaptic neuron to various post-synaptic neurons, according to some embodiments.

FIG. 3 illustrates the synapse core 204a of the system 100 of FIGS. 1 and 2A, where the synapse core 204a transmits forward spikes from a pre-synaptic neuron to various post-synaptic neurons, according to some embodiments. For purposes of FIG. 3, it is assumed that the synapse core 204a is the fan-out synapse of the neuron Na2, which corresponds to the example of FIG. 2A. In some embodiments, the synapse core 204a receives a spike (or a spike request) from the neuron Na2, appropriately weights the spike, and transmits weighted spikes to the neurons Na3, Na6, Nb2, Nb4, Nc1, and Nc3. Because the synapse core 204a receives the spike request from the neuron Na2, from the perspective of the synapse core 204a, the neuron Na2 is a pre-synaptic neuron and the neurons Na3, Na6, Nb2, Nb4, Nc1, and Nc3 are post-synaptic neurons.

In some embodiments, each neuron N has a corresponding address that can uniquely identify the neuron in the system 100. For example, assume that the neuron Na1 has an address Aa1, the neuron Na2 has an address Aa2, the neuron Nc3 has an address Ac3, and so on. In some embodiments, an address of a neuron (e.g., the address Aa1 of the neuron Na1) has two sections: most significant bits (MSBs) identifying a core to which the neuron belongs, and least significant bits (LSBs) identifying the specific neuron in the core. Merely as an example, if there are at most 1028 cores and each core has at most 64 neurons, then the address of a neuron can be 16 bits—the 10 MSBs can identify the core in which the neuron belongs, and the 6 LSBs can identify the neuron in the core. In other embodiments, any other appropriate manner of representing neuron addresses may also work.

Henceforth, for the purposes of this disclosure and unless otherwise mentioned, MSBs of an address (e.g., an address Aa3) of a neuron (e.g., the neuron Na3) may refer to an address or identification (ID) of the neuron core (e.g. the core 102a) to which the neuron Na3 belongs, and LSBs of the address may refer to an address or ID of the neuron Aa3 in the core 102a. Just as a simple example, if the address is "a3" (although such an address is not in binary form, and an actual address would be more complex), then the word "a" (which, for example, is the MSB) identifies the core 102a, and the number "3" (which, for example, is the LSB) identifies the $3^{rd}$ neuron in the core 102a.

In some embodiments, when the pre-synaptic neuron Na2 is to transmit a spike to the post-synaptic neuron Na3, Na6, Nb2, etc., the neuron Na2 transmits an unweighted spike request 302 (henceforth also referred to as a "request 302") to the synapse core 204a. The request 302 is unweighted because no weight has so far been applied to the spike request 302 (e.g., since the spike request 302 is utilized for delivering spikes from a single pre-synaptic neuron to multiple post-synaptic neurons through multiple synapses, each with their own corresponding synaptic weight).

In some embodiments, the request 302 may include an address or an identifier of the pre-synaptic neuron Na2. For example, when the synapse core 204a receives the request 302, the synapse core 204a is aware that the request is coming from the pre-synaptic neuron Na2. In some embodiments, the request 302 also comprises an identifier or address of the synapse core 204a, e.g., so that the request 302 can be routed to the correct synapse core. Merely as an example, if a pre-synaptic neuron is connected to more than one synapse core (e.g., as discussed with respect to FIGS. 2B-2C, where the neuron Na2 is connected to more than one synapse core), then the pre-synaptic neuron can transmit, to each connected synapse core a corresponding unweighted spike request. For purposes of FIG. 3, it is assumed that the pre-synaptic neuron Na2 is transmitting the request 302 to the synapse core 204a, e.g., for eventual transmission of weighted spikes to post-synaptic neurons of the cores 102a, 102b, and 102c. In some embodiments, the request 302 also comprises a sparsity number to indicate the number of fan-out connections made from neuron Na2. The sparsity number provides an indication of a number of post-synaptic neurons that spikes are to be transmitted, e.g., based on the request 302 (e.g., which may be the number of fan-out connections made from neuron Na2). Sparsity is discussed in further detail herein.

As discussed herein, each of the post-synaptic neurons Na3, Na6, Nb2, Nb4, Nc1, and Nc3 has corresponding neuron addresses Aa3, Aa6, Ab2, Ab4, Ac1, and Ac3, respectively. The neuron Na2, in some embodiments, may not store the addresses of its post-synaptic neurons. Furthermore, in some embodiments, the synapse core 204a also may not store the addresses of the post-synaptic neurons Na3, Na6, Nb2, Nb4, Nc1, and Nc3. Rather, in some embodiments, upon receiving the request 302, the synapse core 204a may generate the neuron addresses Aa3, Aa6, Ab2, Ab4, Ac1, and Ac3 (e.g., generates these addresses on the fly), e.g., as discussed in more details herein.

In some embodiments, the synapse core 204a comprises a mapping logic 320. The mapping logic 320 (henceforth also referred to as "logic 320") may be a circuitry or hardware entity, for example. Features of the logic 320 may be an algorithm (or software entity) that may run on a microprocessor, a digital signal processor (DSP), a microcontroller or a computer, or may be implemented primarily using hardware. The logic 320, in some embodiments, may implement a mathematical function f(x), as will be discussed in further details herein.

In some embodiments, the synapse core 204a further comprises a connectivity storage 306 (also referred to herein as "storage 306"), which, for example, can be a memory or a set of register files. In some embodiments, the storage 306 comprises a post-core address storage 316, a seed number storage 312, and a pre-core address storage 308.

In the seed number storage 312 comprises a plurality of seed numbers, which, for example, are used by the logic 320 to generate LSBs of the addresses of the post-synaptic neurons. In some embodiments, seed numbers corresponding to multiple pre-synaptic neurons are stored in the storage 306. For example, if neurons of the core 102a are connected to the synapse core 204a, then the seed numbers 312 corresponding to pre-synaptic neurons of the core 102a are stored in the storage 306.

In some embodiments, at least seed numbers SNa2-a, SNa2-b, and SNa2-c are stored in the storage 312. These seed numbers are applicable when, for example, the neuron Na2 acts as a pre-synaptic neuron. For example, the prefix "a2" in these seed numbers refers to the pre-synaptic neuron Na2, and the suffix "-a", "-b" and "c" refer to respective post-synaptic neuron cores. The seed number SNa2-a may be used to generate addresses of post-synaptic neurons in the core 102a, when, for example, the neuron Na2 is the pre-synaptic neuron. Similarly, the seed number SNa2-b may be used to generate addresses of post-synaptic neurons in the core 102b, when, for example, the neuron Na2 is the pre-synaptic neuron. Similarly, the seed number SNa2-c is used to generate addresses of post-synaptic neurons in the core 102c, when, for example, the neuron Na2 is the pre-synaptic neuron.

In some embodiments, the logic 320 may use the address or identification of the neuron Na2 in the request 302 to access the relevant seed numbers from the seed number storage 312. For example, upon analyzing the request 302, the logic 320 is aware that the pre-synaptic neuron Na2 has transmitted the request 302. Accordingly, the logic 320 accesses the seed numbers SNa2-a, SNa2-b, and SNa2-c corresponding to the pre-synaptic neuron Na2 from the seed number storage 312. In some embodiments, the logic 320 may use the seed numbers SNa2-a, SNa2-b, and SNa2-c to generate the LSBs of the addresses of the post-synaptic neurons Na3, . . . , Nc3. For example, to generate the LSBs of the addresses of the post-synaptic neurons Na3 and Na6 of the core 102a, the logic 320 uses the seed number SNa2-a to generate the LSBs of the addresses of the post-synaptic neurons Nb2 and Nb4 of the core 102b, the logic 320 uses the seed number SNa2-b, and so on.

In some embodiments, the logic 320 implements a finite field mathematical function to generate the LSBs of the addresses of the post-synaptic neurons. A finite field (e.g., a Galois field (GF))) is a field that contains a finite number of elements. For example, if the pre-synaptic neuron Na2 is connected to two post-synaptic neurons Na3 and Na6 is the group 102a, then a finite-field mathematical operation using the seed number SNa2-a will output the LSBs of the addresses of the neurons Na3 and Na6. For example, if the finite-field mathematical operation implemented by the logic 320 is denoted as f(x), where x is an operand, then f(SNa2-a) will output the LSBs of the addresses of the post-synaptic neurons Na3 and Na6. In an example, in a Galois field function, multiplication and division arithmetic blocks may require (e.g., may only require) an arithmetic block based on bitwise shift, AND, and XOR operations.

In some embodiments, a Galois field is used by the logic 320, while in some other embodiments, another reversible hashing function, or mapping function arithmetic may also be used.

If, for example, the seed number SNa2-a is a 6-bit binary number, then there are 64 possible values of this seed number. Merely as an example, in decimal notation, if the seed number SNa2-2 has a value of 1, then the output of the logic 320 is GF(1) (e.g., assuming that the Galois field is used by the logic 320), which has one or more unique values corresponding to the LSBs of the post-synaptic neuron addresses. In another example, in decimal notation, assume the seed number SNa2-2 has a value of 15. In such an example, the output of the logic 320 is GF(15), which has one or more unique values corresponding to the LSBs of the post-synaptic neuron addresses. For example, the logic 320 can be configured such that GF(15) corresponds to the LSBs of the addresses of the post-synaptic neurons Na3 and Na6.

In some embodiments, a configuration of the logic 320 to provide multiple outputs of LSB addresses (for example two different LSBs denoting Na3 and Na6) is controlled by a number of post-synaptic connections the pre-synaptic neuron makes (e.g. sparsity of the connections). For example, in FIG. 3, the neuron Na2 has six fan-out connections (e.g., connected to six post-synaptic neurons), and accordingly, the logic 320 has a specific configuration. If the neuron Na2 were to be connected to, for example, 12 post-synaptic neurons, then the configuration of the logic 320 may be different.

In some embodiments, the seed numbers in the storage 312 may be configurable. For example, if a user desires to reconfigure the system 100 such that the pre-synaptic neuron Na2 is to be connected to post-synaptic neurons Na1 and Na5 (e.g., instead of the post-synaptic neurons Na3 and Na6 illustrated in FIG. 3) of the core 102a, then such a change can be achieved by appropriately changing the value of the seed number SNa2-a.

In some embodiments, the post-core address storage 316 outputs MSBs of the addresses of the post-synaptic neurons. For example, for the post-synaptic neurons Na3 and Na6, the MSBs of their respective addresses Aa3 and Aa6 can be the same, and the MSBs may identify the core 102a to which these neurons belong. Similarly, for the post-synaptic neurons Nb2 and Nb4, the MSBs of their respective addresses Ab2 and Ab4 can be the same, and the MSBs may identify the core 102b to which these neurons belong.

Thus, the logic 320 may generate the LSBs of the addresses Aa3 and Aa6 of the neurons Na3 and Na6 (e.g., which can respectively be the identification of the neurons Na3 and Na6 within the core 102a); and the post-core address storage 316 may provide the MSBs of these addresses (e.g., which can be identification of the core 102a within the system 100). A component 310 within the synapse core 204a receives the LSBs and the MSBs, and the component 310 appends, concatenates, sums and/or combines these to, for example, generate the addresses Aa3 and Aa6. FIG. 3 illustrates an example scenario where the address Aa3 is generated by the synapse core 204a.

Similar to generating the addresses Aa3 and Aa6 of the post-synaptic neurons Na3 and Na6 of the core 102a, in some embodiments, the addresses Ab2 and Ab4 of the post-synaptic neurons Nb2 and Nb4 of the core 102b may also be generated. For example, the logic 320 may output the respective LSBs of these two addresses (e.g., which can respectively be the identification of the neurons Nb2 and Nb4 within the core 102b), based on the seed number SNa2-b. The post-core address storage 316 may output the MSBs of these addresses, which, for example, may uniquely identify the core 102b. The component 310 may output the addresses Ab2 and Ab4 based on the LSBs output by the logic 320 and the MSBs output by the post-core address storage 316. In some embodiments, the addresses Ac1 and Ac3 of the post-synaptic neurons Nc1 and Nc3 of the core 102c may also be generated in a similar manner (e.g., based on the seed number SNa2-c).

As discussed herein and as illustrated in FIG. 3, the seed number storage 312 stores the seed numbers SNa2-a, SNa2-b, and SNa2-c for the pre-synaptic neuron Na2. In a similar manner, the seed number storage 312 may also store seed numbers for other neurons acting as pre-synaptic neuron. Merely as an example, for the neuron Na5 acting as a pre-synaptic neuron, seed numbers SNa5-a, SNa5-b, and SNa5-c may also be stored in the seed number storage 312.

In some embodiments, the synapse core 204a further comprises a memory 304 storing a plurality of synaptic weights. For example, in response to receiving the request 302, the synapse core 204a transmits spikes Sa3, Sa6, Sb2, etc. to post-synaptic neurons Na3, Na6, Nb2, etc., respectively. The spikes Sa3, Sa6, Sb2, etc. are weighted by the synapse core 204a using synaptic weights, e.g., before being transmitted to the respective neurons. The synaptic weights, for example, are stored in the memory 304.

The memory 304 can be any appropriate type, e.g., nonvolatile and/or volatile memory, a cache memory, flash memory, optical disks, CD-ROMs, DVD ROMs, RAMs, EPROMs, EEPROMs, magnetic or optical cards, phase change memory (PCM), or other type of memory. In an example, the memory 304 is a static random-access memory (SRAM).

In some embodiments, the memory 304 is illustrated using a number of row and columns. Although data in the memory 304 may or may not be stored in the form of rows and columns, such rows and columns are illustrated in FIG. 3 for visually representing a logical manner in which the synaptic weights are stored in the memory 304.

In some embodiments, a row of the memory 304 may be associated with a corresponding pre-synaptic neuron. In an example, assume that the memory 304 corresponds to pre-synaptic neurons of the core 102a only, and also assume that the core 102a has a maximum of 64 neurons (e.g., neuron Na1, . . . , Na64). Then, in an example, the memory may have 64 rows, where each row is associated with a corresponding pre-synaptic neuron of the 64 neurons of the core 102a. For example, if the neuron Na1 is to operate as a pre-synaptic neuron, then a first row of the memory 304 may provide corresponding synaptic weights; if the neuron Na2 is to operate as a pre-synaptic neuron, then a second row of the memory 304 may provide corresponding synaptic weights (e.g., as illustrated in FIG. 3); and so on.

In another example, if the memory 304 is to provide synaptic weights for pre-synaptic neurons of two cores (e.g., cores 102a and 102b), then the memory 304 can have 128 rows (e.g., assuming that there are 64 neurons in each core). In yet another example, if the memory 304 is to provide synaptic weights for pre-synaptic neurons of three cores (e.g., cores 102a, 102b, and 102c), then the memory 304 can have 192 rows (e.g., assuming that there are 64 neurons in each core).

For a pre-synaptic neuron (e.g., neuron Na1) that corresponds to a specific row of the memory 304, the columns of the memory 304 corresponds to the post-synaptic neurons to which the pre-synaptic neuron Na1 may transmit one or more spikes.

In some embodiments (and assuming 64 neurons per core), if the memory 304 provides synaptic weights for post-synaptic neurons of a single core, then the memory 304 may have 64 columns; if the memory 304 provides synaptic weights for post-synaptic neurons of two cores, then the memory 304 may have 128 rows and 64 columns, where a pre-synaptic neuron is mapped to two rows; if the memory 304 provides synaptic weights for post-synaptic neurons of three cores, then the memory 304 may have 192 rows and 64 columns, where a pre-synaptic neuron is mapped to three rows; and so on. In such an implementation, the columns of the memory 304 correspond to 64 neurons of a core, under the assumption that a pre-synaptic neuron is connected to all the 64 neurons. Depending on sparsity of the connections, however, a pre-synaptic neuron may connect only a subset of the 64 neurons. This may, for example, result in multiple unused entries in the memory 304.

For example, assume that the pre-synaptic neuron Na2 can transmit spikes to six post-synaptic neurons, as illustrated in FIG. 3 (e.g., transmit spikes to two neurons in each core). For such a case and assuming that the memory 304 provides synaptic weights for the pre-synaptic neuron Na2 and post-synaptic neurons of the cores 102a, 102b, and 102c (e.g., the memory 304 having 192 rows and 64 columns), then for each of the $2^{nd}$, $66^{th}$, and $130^{th}$ rows of the memory 304, only two entries may be used for Na2 (e.g., six entries in total corresponding to the synaptic connections to the post-synaptic neurons Na3, Na6, Nb2, Nb4, Nc1, and Nc3), such that the remaining 62 entries on each of these 3 specific rows are unused (e.g., free to be utilized by other neurons). For example, for the pre-synaptic neuron Na2, the $2^{nd}$ row of the memory 304 may have two entries corresponding to the post-synaptic neurons Na3 and Na6 of the core 102a; the $66^{th}$ row of the memory 304 may have two entries corresponding to the post-synaptic neurons Nb2 and Nb4 of the core 102b; and the $130^{th}$ row of the memory 304 may have two entries corresponding to the post-synaptic neurons Nc1 and Nc3 of the core 102a. Under a given sparsity configuration, the 62 remaining entries of each of these three rows may not be used for storing synaptic weights for the pre-synaptic neuron Na2.

In the above example (e.g., where there may be multiple free entries in the memory 304), the number of free entries may be based on a sparsity of the system 100. For example, the system 100 can have hundreds or thousands, or even millions (or billions) of neurons, and a neuron can transmit spikes to merely a few thousand other neurons. Thus, the interconnection in the system 100 can be sparse. Merely as an example, a 50% sparsity implies that if there are 64 neurons in the core 102a, then a neuron may transmit spikes to 32 other neurons in any core 102. In another example, a 6.25% sparsity implies that if there are 64 neurons in the core 102a, then a neuron may transmit spikes to 4 other neurons in any core 102. In some embodiments, a sparsity number may set per core 102, and can be stored in any type of memory, register file, sequential logic element. A highly dense network (e.g., which may correspond to 100% sparsity) implies that each neuron can transmit spikes to any other neuron. A fully sparse network (e.g., which may correspond to 0% sparsity) implies that a neuron may not be connected to another neuron. The sparser the network (e.g., the less is the sparsity percentage), the higher is the number free entries in the memory 304. In some embodiments, if the sparsity percentage is reasonably low, then multiple entries in the memory 304 (e.g., those entries that are free or unused) can be turned off, be in a low power mode, or these entries may be simply absent from the memory 304, e.g., to save storage area. In some embodiments, the sparsity is sent out with the spike request 302.

In some other embodiments, a number of columns in the memory 304 can correspond to the number of neurons within a neuron group residing in a core 102. A specific pre-synaptic neuron can transmit spike to a set of post-synaptic neurons in a neuron core 102, with each synaptic weight stored in a single row. For example, if the neuron Na2 can transmit spikes to six post-synaptic neurons residing in neuron core 102, then the second row of the memory 304 can have six columns.

In some embodiment, memory area may be saved by utilizing the unused (or free) entries by mapping more than one pre-synaptic neuron to the same rows. In some embodiments, pre-synaptic neuron address and a row address offset can be used to generate a memory address to achieve such mapping of multiple pre-synaptic neurons to a same row. For example, assume a scenario where there are 64 neurons per core, and a sparsity of 6.25% (e.g., each neuron may transmit spikes to four other neurons). Then, as discussed herein, the memory 304 can have 64 columns, and for a specific row corresponding to the pre-synaptic neuron Na2, four entries may be used to store synaptic weights. In some embodiments, the remaining 60 entries of that specific row can be used to store synaptic weights corresponding to other pre-synaptic neurons (e.g., for 15 other pre-synaptic neurons). For example, synaptic weights corresponding to 16 pre-synaptic neurons can be stored in a specific row of the memory 304.

In another example, if the sparsity is 50%, then synaptic weights corresponding to 2 pre-synaptic neurons can be stored in a specific row of the memory 304, and if the sparsity if 25%, then synaptic weights corresponding to 4 pre-synaptic neurons can be stored in a specific row of the memory 304.

For the purposes of this disclosure, if an example neuron Np1 transmits a spike to another example neuron Np2, then the synaptic weight is denoted by Wp1-p2 (where, for example, the prefix "p1" denotes the pre-synaptic neuron, and the suffix "p2" denotes the post-synaptic neuron). So, for example, if the neuron Na2 transmits a spike to the neuron Na3, then the corresponding synaptic weight may be denoted by Wa2-a3. Thus, for the six post-synaptic neurons Na3, Na6, Nb2, Nb4, Nc1, and Nc3, the memory 304 may output six synaptic weights Wa2-a3, Wa2-a6, Wa2-b2, Wa2-b4, Wa2-c1, and Wa2-c3, respectively (e.g., from the second row of the memory 304).

Thus, the component 310 outputs the addresses Aa3, . . . , Ac3 of the six post-synaptic neurons Na3, Na6, Nb2, Nb4, Nc1, and Nc3, respectively; and the memory 304 outputs the six synaptic weights Wa2-a3, . . . Wa2-c3 for these six post-synaptic neurons. In some embodiments, the component 310 and/or the memory 304 may output these data in a time-multiplexed manner, while in some other embodiments, the component 310 and/or the memory may output these data in parallel.

In some embodiments, the synapse core 204a transmits a spike Sa3 to the post-synaptic neuron Na3, where the spike Sa3 includes, embeds, is associated with, and/or is accompanied by the corresponding synaptic weight Wa2-a3 and the corresponding address Aa3 of the neuron Na3. Merely as an example, the spike Sa3 is transmitted to the neuron address Aa3 and has a synaptic weight of Wa2-a3. The synapse core 204a similarly transmits a spike Sa6 to the post-synaptic neuron Na6, which is transmitted to the neuron address Aa6 and has a synaptic weight of Wa2-a6. The synapse core 204a similarly transmits spikes Sb2, Sb4, Sc1, and Sc3 to the post-synaptic neurons Nb2, Nb4, Nc1, and Nc3, respectively.

In some embodiments, the spikes Sa3, . . . , Sc3 are transmitted respectively to the post-synaptic neurons Na3, . . . , Nc3 in parallel. In some other embodiments, the spikes Sa3, . . . , Sc3 are transmitted respectively to the post-synaptic neurons Na3, . . . , Nc3 serially, e.g., in a time multiplexed manner.

In some embodiments and as discussed above, in the synapse core 204a of FIG. 3, the six addresses Aa3, . . . , Ac3 of the six post-synaptic neurons Na3, . . . , Nc3 need not be stored in the synapse core 204a. Rather, these addresses may be generated on-the-fly, e.g., as and when required, by the logic 320 and the component 310, using the seed numbers from the storage 312. In a conventional large neuromorphic computing system, storing the addresses of the post-synaptic neurons requires a relatively large storage space. In contrast, using the teachings of this disclosure, the seed numbers, which may be stored in a relatively small storage space, can be used to generate the addresses of the post-synaptic neurons only when required. Thus, the teachings of this disclosure result in substantially less storage space in a synapse core, e.g., compared to a synapse core in a conventional system storing all the actual addresses of all the post-synaptic neurons for all pre-synaptic neurons.

FIG. 3 illustrates the synapse core 204a performing a forward-propagation (FWD) of spikes from the pre-synaptic neuron Na1 to six post-synaptic neurons. In some embodiments, the synapse core 204a may also allow backward-propagating (BCK) spikes from a post-synaptic neuron to a pre-synaptic neuron. For example, in a restricted Boltzmann machine, used in some neuromorphic computing systems, synaptic connections may be undirected and a behavior of BCK spikes may be identical or near identical to that of FWD spikes. In an example, BCK spikes are observed in biology and enable learning through Spike Timing Dependent Plasticity (STDP).

Figure 4:
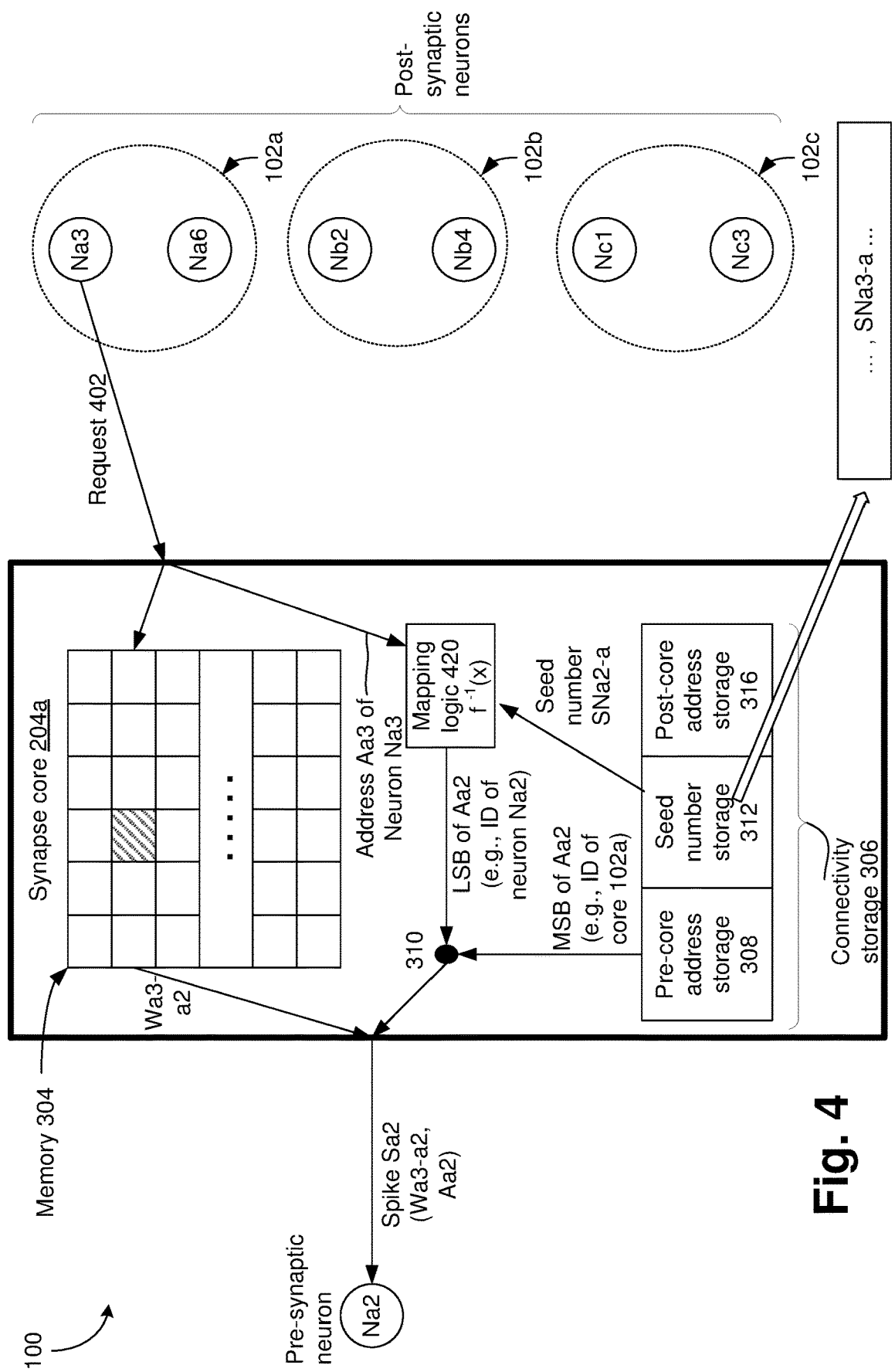
FIG. 4 schematically illustrates transmission of a backward spike from a post-synaptic neuron to a pre-synaptic neuron, according to some embodiments.

FIG. 4 illustrates transmission of a backward spike from an example post-synaptic neuron Na3 to an example pre-synaptic neuron Na2, according to some embodiments. In some embodiments, the post-synaptic neuron Na3 transmits an unweighted spike request 402 (henceforth also referred to as a "request 402") to the synapse core 204a. In some embodiments, the request 402 includes an address or an identifier of the post-synaptic neuron Na3, and an address of the synapse core 204a. In an example, synaptic weight Wa3-a2 is accessed from the memory 304.

As discussed herein, the logic 320 implements the finite field mathematical function, or a Galois field function to generate the LSBs of the post-synaptic neuron address. In some embodiments, the finite field mathematical function may be reversible. For example, if f(x) represents a multiplication in the Galois Field, then represents a division in the Galois Field.

In some embodiments, because the mapping function implemented in the logic 320 may be reversible, if a function f(x) is used in the logic 320 in the example of FIG. 3, then in the example of FIG. 4 an inverse (or compliment) of the function 320 (e.g., illustrated as function 420 in FIG. 4), e.g., a function f−1(x)) may be used to calculate the LSBs of the address Aa2. Furthermore, the pre-core address storage 308 may output an MSB of the address Aa2 (e.g., which may be the identifier of the core 102a). In some embodiments, the component 310 may combine the LSBs and the MSBs to generate the address Aa1. Subsequently, the synapse core 204a may output the spike Sa2 for the neuron Na2, where the spike Sa2 may include, embed, associate with, and/or be accompanied by the corresponding synaptic weight Wa3-a2 and the corresponding address Aa2 of the neuron Na2.

Figure 5:
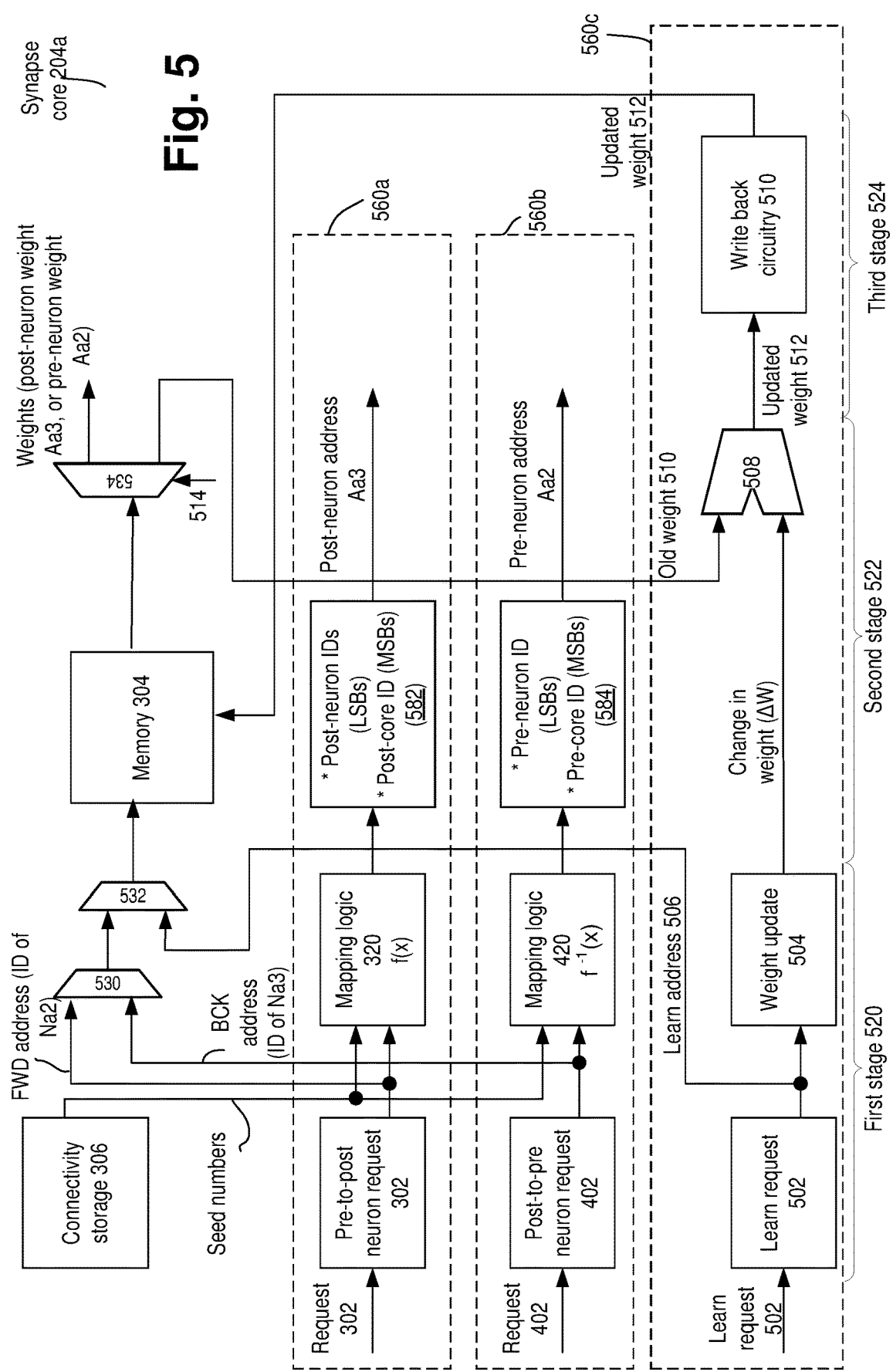
FIG. 5 schematically illustrates an example implementation of a synapse core of a neuromorphic computing system, according to some embodiments.

FIG. 5 illustrates an example implementation of the synapse core 204a of FIGS. 3-4, according to some embodiments. In some embodiments, the synapse core 204a in FIG. 5 is implemented using three parallel blocks 560a, 560b, and 560c, illustrated using dotted lines.

In some embodiments, the block 560a receives unweighted spike requests (e.g., the request 302 of FIG. 3), which is also referred to as pre-to-post neuron request (e.g., because the request 302 is from the pre-synaptic neuron Na2 to multiple post-synaptic neurons). Also, as discussed herein, spikes can travel forward (e.g., as discussed with respect to FIG. 3), which are referred to as FWD spikes; and spikes can travel backward (e.g., as discussed with respect to FIG. 4), which are referred to as BCK spikes. Because the request 302 is for forward spikes, the request 302 is also referred to as a FWD request, and associated addresses are labelled using the term "FWD."

Upon receiving the request 302, the block 560a accesses the connectivity storage 306 (e.g., transmits an ID and/or an address of the neuron Na2 generating the request 302), based on which of the seed number storage 312 transmits seed numbers (e.g., seed numbers SNa2-a, SNa2-b, SNa2-c) to the block 560a. The logic 320 in the block 560a uses the received seed numbers to generate the LSBs of the address of post-synaptic neurons. In some embodiments, the number of LSBs to generate, coupled with the number of memory accesses to memory 304 to to read out the associated synaptic weights to each of these generated LSBs, is decided by the sparsity number, which may be received in request 302. Also, although not illustrated in FIG. 5, the block 560a also accesses (e.g., from the post-core address storage 316) the identification of the cores associated with the post-synaptic neurons, which may be the MSBs of the post-synaptic neuron address. In some embodiments, a component (e.g., the component 310, illustrated generally as block 582 in FIG. 5) combines or concatenates the LSBs and the MSBs to generate post-synaptic neuron addresses (e.g., address Aa3 of neuron Na3). In some embodiments, the memory 304 also receives the ID and/or the address of the neuron Na2 generating the request 302, e.g., via multiplexers 530 and 532. The memory 304 accesses the associated entries and outputs the synaptic weights, which are output via a selection circuitry 534 (which, for example, is controlled by a signal 514). The output of the circuitry 534 is the synaptic weights (e.g., weight Aa3 for the spike from the pre-synaptic neuron Na2 to the post-synaptic neuron Na3). The weights output by the circuitry 534 and the post-synaptic neuron addresses output by the block 582 are combined to form the spikes Sa3, Sa6, Sb2, etc., e.g., as also discussed with respect to FIG. 3.

In some embodiments, as the block 560a is associated with forward spikes from pre-synaptic neurons to post-synaptic neurons, the block 560a is also referred to herein as a forward block, FWD block, or the like.

In some embodiments, the block 560b receives unweighted spike requests (e.g., the request 402 of FIG. 4), which is also referred to as post-to-pre neuron request, e.g., because the request 402 is from a post-synaptic neuron (e.g., from the neuron Na3) to a pre-synaptic neuron (e.g., the neuron Na2). Because the request 402 is for a backward spike, the request 402 is also referred to as a BCK request, and associated addresses are labelled using the term "BCK."

Upon receiving the request 402, the block 560b accesses the connectivity storage 306 (e.g., transmits an ID and/or an address of the neuron Na3 generating the request 402), based on which the seed number storage 312 transmits the seed numbers (e.g., seed number SNa3-a) to the block 560b. The logic 420 in the block 560b uses the received seed numbers to generate the LSBs of the address of the pre-synaptic neurons. In some embodiments, the number of LSBs to generate, coupled with the number of memory accesses to memory 304 to make to read out the associated synaptic weights to each of these generated LSBs, is decided by the sparsity number, received in request 402. Also, although not illustrated in FIG. 5, the block 560b also accesses (e.g., from the pre-core address storage 308) the identification of the cores associated with the pre-synaptic neurons, which may be the MSBs of the pre-synaptic neuron addresses. In some embodiments, a component (e.g., the component 310, illustrated generally as block 584 in FIG. 5) combines or concatenates the LSBs and the MSBs to generate pre-synaptic neuron addresses (e.g., address Aa2 of the neuron Aa2). In some embodiments, the memory 304 also receives the ID and/or the address of the neuron Na3 generating the request 402, e.g., via multiplexers 530 and 532. The memory 304 accesses the associated entries and outputs the synaptic weights, which are output via the selection circuitry 534. The output of the circuitry 534 is the synaptic weights (e.g., weight Aa2 for the spike from the post-synaptic neuron Na3 to the pre-synaptic neuron Na2). The weights output by the circuitry 534 and the pre-synaptic neuron addresses output by the block 584 are combined to form the spike Sa2, e.g., as also discussed with respect to FIG. 4.

In some embodiments, as the block 560b is associated with backward spikes from post-synaptic neurons to pre-synaptic neurons, the block 560b is also referred to herein as a backward block, BCK block, or the like.

In some embodiments, the block 560c is referred to as a learning block. In some embodiments, the system 100 is continuously and/or adaptively learning using a variety of means, as is typical in a neuromorphic computing system. Such learning may sometimes necessitate updating the weights stored in the memory 304. The updating of the weights in the memory 304, for example, may be done via the block 560c. In some embodiments, the block 560c receives a learn request 502. In some embodiments, the learn request 502 may include information associated with updating at least one synaptic weight stored in the memory 304. The learn request 502 may also include one or more addresses (labeled as learn address 506 in FIG. 5) of the pre-synaptic and/or post synaptic neurons for which the weights are to be updated.

In some embodiments, the block 560c transmits a learn address 506 to the memory 304 (e.g., via the multiplexer 532), based on which the memory 304 accesses the weights that are to be updated, and outputs these weights (e.g., labeled as "old weight 510" in FIG. 5) via the circuitry 534. Furthermore, a weight update circuitry 504 generates a change Δw that is to be made to the old weight 510. A circuitry 508 receives the old weight 510 from the memory 304 via circuitry 534 and also receives the change Δw in the weight, and outputs an updated weight 512. A write back circuitry 510 writes back the updated weight 512 to the memory 304, thereby completing the weight updating operation.

In some embodiments, the circuitry 534 can output the weights from the memory 304 as either pre/post neuron synaptic weights for transmission to another neuron, or as old weight 510. The circuitry 534 is controlled by a signal 514, which may be a read/write selection signal. For example, when the memory 304 is to be read and weights are to be only output from the memory 304 (e.g., when one of the blocks 560a or 560b is active), then the weights may output as pre/post neuron synaptic weights for transmission to another neuron. On the other hand, when the memory 304 is to be read and also written to (e.g., by the block 560c during updating the weights), then the circuitry 534 outputs the weights from the memory 304 as old weight 510.

Various variations of the synapse core 204a of FIG. 5 may be envisioned by those skilled in the art, e.g., based on the teachings of this disclosure. Merely as an example, the multiplexers 530 and 532 can be combined to form a single multiplexer with three inputs from blocks 560a, 560b, and 560c, respectively.

As illustrated in FIG. 5, the synapse core 204a of FIG. 5 may be implemented in three stages, 520, 522, and 524. The blocks 560a, 560b and 560c can be implemented in the first two stages, 520 and 522, and some of the operations of the block 560c (e.g., the write back circuitry 510) may implemented in a third stage 524.

Figure 6:
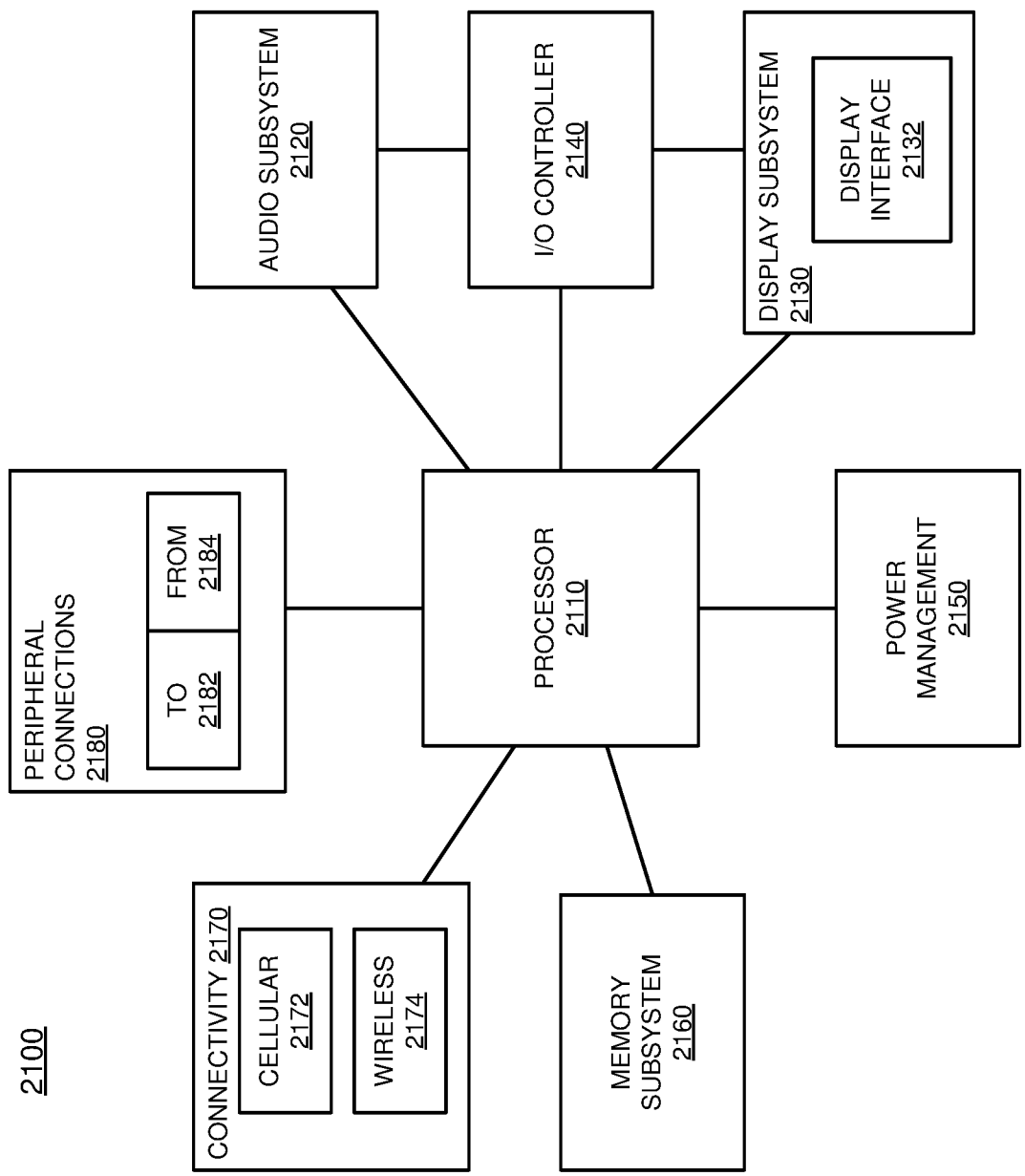
FIG. 6 schematically illustrates a computer system or an SoC (System-on-Chip), where a synapse core and neurons are included, in accordance with some embodiments.

FIG. 6 illustrates a computer system or an SoC (System-on-Chip) 2100, where a synapse core and neurons are included, in accordance with some embodiments. It is pointed out that those elements of FIG. 6 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, various components illustrated in FIGS. 1-5, for example, can be incorporated in one or more components of the computing device 2100 of FIG. 6. Merely as an example, the synapse core 204 can be included or implemented at least in part using the processor 2110. In some embodiments, one or more neurons discussed above can be included or implemented at least in part using the processor 2110.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Example 1. A neuromorphic computing system comprising: a synapse core; and a pre-synaptic neuron, a first post-synaptic neuron, and a second post-synaptic neuron coupled to the synaptic core, wherein the synapse core is to: receive a request from the pre-synaptic neuron, and generate, in response to the request, a first address of the first post-synaptic neuron and a second address of the second post-synaptic neuron, wherein the first address and the second address are not stored in the synapse core prior to receiving the request.

Example 2. The neuromorphic computing system of example 1, wherein the synapse core is to: transmit (i) a first weighted spike to the first address of the first post-synaptic neuron and (ii) a second weighted spike to the second address of the second post-synaptic neuron.

Example 3. The neuromorphic computing system of any of examples 1-2, wherein the synapse core is to generate the first address and the second address by: a finite field mathematical function which is to apply to a first seed number to generate the first address; and the finite field mathematical function which is to apply to a second seed number to generate the second address.

Example 4. The neuromorphic computing system of any of examples 1-2, wherein the synapse core is to generate the first address and the second address by: a finite field mathematical function which is to apply to a first seed number to generate the first address and the second address.

Example 5. The neuromorphic computing system of any of examples 1-2, wherein the synapse core is to generate the first address by: a finite field mathematical function which is to apply to a seed number to generate least significant bits (LSBs) of the first address; a storage which is to be accessed to retrieve most significant bits (MSBs) of the first address; and the first address which is to generate based on the LSBs of the first address and the MSBs of the first address.

Example 6. The neuromorphic computing system of any of examples 1-2, wherein the first post-synaptic neuron is included in a first core of the neuromorphic computing system, and wherein the synapse core is to generate the first address by: a Galois field function which is to apply to a seed number to generate an identification of the first post-synaptic neuron within the first core; a storage which is to be accessed to retrieve an identification of the first core; and the first address which is to be generated based on the identification of the first post-synaptic neuron and the identification of the first core.

Example 7. The neuromorphic computing system of any of examples 1-6, wherein the synapse core is to: associate a first weight with a first spike to generate the first weighted spike; and associate a second weight with a second spike to generate the second weighted spike.

Example 8. The neuromorphic computing system of example 7, further comprising: a memory to store the first weight and the second weight; and one or more registers to store a plurality of seed numbers, wherein the first address and the second address are to be generated based on one or more seed numbers of the plurality of seed numbers.

Example 9. The neuromorphic computing system of example 8, further comprising: circuitry to update the first weight and the second weight in the memory.

Example 10. A synapse core of a neuromorphic computing system, the synapse core comprising: mapping logic to (i) receive a request, the request comprising an identification of a pre-synaptic neuron that generated the request, (ii) access a based on the identification of the pre-synaptic neuron, and (iii) map the seed number to an identification of a post-synaptic neuron that is included in a first core of the neuromorphic computing system; and a first storage to provide an identification of the first core, wherein the synapse core is to (i) generate an address of the post-synaptic neuron, based at least in part on the identification of the post-synaptic neuron and the identification of the first core, and (ii) transit a spike to the address of the post-synaptic neuron.

Example 11. The synapse core of example 10, wherein the request is a first request, wherein the seed number is a first seed number, and wherein the mapping logic is to: receive a second request, the second request comprising the identification of the post-synaptic neuron that generated the second request; access a second seed number based on the identification of the post-synaptic neuron; and map the second seed number to the identification of the pre-synaptic neuron.

Example 12. The synapse core of example 11, wherein: the mapping logic is to (i) map the seed number to the identification of the post-synaptic neuron request using at least in part a first mathematical function, and (ii) map the second seed number to the identification of the pre-synaptic neuron using at least in part a second mathematical function, wherein the second mathematical function is an inverse of the first mathematical function.

Example 13. The synapse core of any of examples 10-12, wherein the synapse core is to: associate a weight to the spike, prior to the transmission of the spike to the address of the post-synaptic neuron.

Example 14. The synapse core of any of example 13, further comprising: a memory to store the weight.

Example 15. The synapse core of example 14, further comprising: circuitry to update the weight in the memory, wherein the circuitry comprises: a first circuitry to generate a change in weight; a second circuitry to read an original weight from the memory; a third circuitry to generate an updated weight based on the change in weight and the original weight; and a fourth circuitry to write the updated weight to the memory.

Example 16. The synapse core of any of examples 10-15, wherein: the request includes a sparsity number; and the mapping logic is to map the seed number to identifications of a first number of post-synaptic neurons, the first number based on the sparsity number.

Example 17. A neuromorphic computing system comprising: the synapse core of any of examples 10-16; the pre-synaptic neuron; and the post-synaptic neuron.

Example 18. One or more non-transitory computer-readable storage media to store instructions that, when executed by a processor, cause the processor to: receive a request from a pre-synaptic neuron; generate, in response to the request, an address of a post-synaptic neuron, wherein the address is not stored in an apparatus, which comprises the processor, prior to receiving the request; and transmit a weighted spike to the address of the post-synaptic neuron.

Example 19. The one or more non-transitory computer-readable storage media of example 18, wherein the instructions, when executed, cause the processor to: apply a finite field mathematical function to a seed number to generate a first section of the address.

Example 20. The one or more non-transitory computer-readable storage media of example 19, wherein the instructions, when executed, cause the processor to: access a storage to retrieve a second section of the address; and generate the address based on the first section and the second section.

Example 21. The one or more non-transitory computer-readable storage media of example 18, wherein the instructions, when executed, cause the processor to: apply a Galois field function to a seed number to generate an identification of the post-synaptic neuron, wherein the post-synaptic neuron is included in a core of a neuromorphic computing system; access a storage to retrieve an identification of the core; and generate the address based on the identification of the post-synaptic neuron and the identification of the core.

Example 22. The one or more non-transitory computer-readable storage media of any of examples 18-21, wherein the instructions, when executed, cause the processor to: associate a synaptic weight with a spike to generate the weighted spike.

Example 23. A method comprising: receiving a request from a pre-synaptic neuron; generating, in a synapse core and in response to the request, an address of a post-synaptic neuron, wherein the address is not stored in the synapse core prior to receiving the request; and transmitting a weighted spike to the address of the post-synaptic neuron.

Example 24. The method of example 23, further comprising: applying a finite field mathematical function to a seed number to generate a first section of the address.

Example 25. The method of example 24, further comprising: accessing a storage to retrieve a second section of the address; and generating the address based on the first section and the second section.

Example 26. The method of example 23, further comprising: applying a Galois field function to a seed number to generate an identification of the post-synaptic neuron, wherein the post-synaptic neuron is included in a core of a neuromorphic computing system; accessing a storage to retrieve an identification of the core; and generating the address based on the identification of the post-synaptic neuron and the identification of the core.

Example 27. The method of example 26, wherein the identification of the post-synaptic neuron forms least significant bits of the address, and wherein the identification of the core forms most significant bits of the address.

Example 28. The method of any of examples 23-27, further comprising: associating a synaptic weight with a spike to generate the weighted spike.

Example 29. One or more non-transitory computer-readable storage media to store instructions that, when executed by a processor, cause the processor to execute a method in any of the examples 23-28.

Example 30. An apparatus comprising: means for performing the method in any of the examples 23-28.

Example 31. An apparatus comprising: means for receiving a request from a pre-synaptic neuron; means for generating, in a synapse core and in response to the request, an address of a post-synaptic neuron, wherein the address is not stored in the synapse core prior to receiving the request; and means for transmitting a weighted spike to the address of the post-synaptic neuron.

Example 32. The apparatus of 31, further comprising: means for applying a finite field mathematical function to a seed number to generate a first section of the address.

Example 33. The apparatus of example 32, further comprising: means for accessing a storage to retrieve a second section of the address; and means for generating the address based on the first section and the second section.

Example 34. The apparatus of example 31, further comprising: means for applying a Galois field function to a seed number to generate an identification of the post-synaptic neuron, wherein the post-synaptic neuron is included in a core of a neuromorphic computing system; means for accessing a storage to retrieve an identification of the core; and means for generating the address based on the identification of the post-synaptic neuron and the identification of the core.

Example 35. The apparatus of example 34, wherein the identification of the post-synaptic neuron forms least significant bits of the address, and wherein the identification of the core forms most significant bits of the address.

Example 36. The apparatus of any of examples 31-35, further comprising: means for associating a synaptic weight with a spike to generate the weighted spike.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A synapse core of a neuromorphic computing system, the synapse core comprising:
 mapping logic to:
  receive a request, the request comprising an identification of a pre-synaptic neuron that generated the request;
  access a seed number based on the identification of the pre-synaptic neuron; and
  map the seed number to an identification of a post-synaptic neuron that is included in a core of the neuromorphic computing system; and
 a storage to provide an identification of the core;

wherein the synapse core is to:
    generate an address of the post-synaptic neuron, based at least in part on the identification of the post-synaptic neuron and the identification of the core; and
    transit a spike to the address of the post-synaptic neuron.

2. The synapse core of claim 1, wherein the request is a first request, wherein the seed number is a first seed number, and wherein the mapping logic is to:
    receive a second request, the second request comprising the identification of the post-synaptic neuron that generated the second request;
    access a second seed number based on the identification of the post-synaptic neuron; and
    map the second seed number to the identification of the pre-synaptic neuron.

3. The synapse core of claim 1, wherein:
    the mapping logic is to:
        map the seed number to the identification of the post-synaptic neuron request using at least in part a first mathematical function; and
        map the second seed number to the identification of the pre-synaptic neuron using at least in part a second mathematical function,
    wherein the second mathematical function is an inverse of the first mathematical function.

4. The synapse core of claim 3, wherein the synapse core is to:
    associate a weight to the spike, prior to the transmission of the spike to the address of the post-synaptic neuron.

5. The synapse core of claim 4, further comprising:
a memory to store the weight.

6. The synapse core of claim 5, further comprising:
circuitry to update the weight in the memory, wherein the circuitry comprises:
    a first circuitry to generate a change in weight;
    a second circuitry to read an original weight from the memory;
    a third circuitry to generate an updated weight based on the change in weight and the original weight; and
    a fourth circuitry to write the updated weight to the memory.

7. The synapse core of claim 6, wherein:
    the request includes a sparsity number; and
    the mapping logic is to map the seed number to identifications of a first number of post-synaptic neurons, the first number based on the sparsity number.

8. One or more non-transitory computer-readable storage media to store instructions that, when executed by a processor, cause the processor to:
    receive a request from a pre-synaptic neuron;
    generate, in response to the request, an address of a post-synaptic neuron, wherein the address is not stored in an apparatus, which comprises the processor, prior to receiving the request; and
    transmit a weighted spike to the address of the post-synaptic neuron.

9. The one or more non-transitory computer-readable storage media of claim 8, wherein the instructions, when executed, cause the processor to:
    apply a finite field mathematical function to a seed number to generate a first section of the address.

10. The one or more non-transitory computer-readable storage media of claim 9, wherein the instructions, when executed, cause the processor to:
    access a storage to retrieve a second section of the address; and
    generate the address based on the first section and the second section.

11. The one or more non-transitory computer-readable storage media of claim 8, wherein the instructions, when executed, cause the processor to:
    apply a Galois field function to a seed number to generate an identification of the post-synaptic neuron, wherein the post-synaptic neuron is included in a core of a neuromorphic computing system;
    access a storage to retrieve an identification of the core; and
    generate the address based on the identification of the post-synaptic neuron and the identification of the core.

12. The one or more non-transitory computer-readable storage media of claim 8, wherein the instructions, when executed, cause the processor to:
    associate a synaptic weight with a spike to generate the weighted spike.

13. An apparatus comprising:
    a first circuitry to receive a request from a pre-synaptic neuron;
    a second circuitry to generate, in response to the request, an address of a post-synaptic neuron, wherein the address is not stored in the apparatus, prior to the request being received; and
    a third circuitry to transmit a weighted spike to the address of the post-synaptic neuron.

14. The apparatus of claim 13 comprises a fourth circuitry to apply a finite field mathematical function to a seed number to generate a first section of the address.

15. The apparatus of claim 14 comprises a fifth circuitry to access a storage to retrieve a second section of the address.

16. The apparatus of claim 15 comprises a sixth circuitry to generate the address based on the first section and the second section.

17. The apparatus of claim 16 comprises a seventh circuitry to apply a Galois field function to a seed number to generate an identification of the post-synaptic neuron, wherein the post-synaptic neuron is included in a core of a neuromorphic computing system.

18. The apparatus of claim 17 comprises a seventh circuitry to access a storage to retrieve an identification of the core.

19. The apparatus of claim 18 comprises an eighth circuitry to generate the address based on the identification of the post-synaptic neuron and the identification of the core.

20. The apparatus of claim 19 comprises a ninth circuitry to associate a synaptic weight with a spike to generate the weighted spike.

* * * * *